United States Patent
Harmening et al.

(10) Patent No.: US 12,258,281 B2
(45) Date of Patent: Mar. 25, 2025

(54) STRONTIUM ALUMINATE MIXED OXIDE AND METHOD FOR PRODUCING SAME

(71) Applicant: Sasol Germany GmbH, Hamburg (DE)

(72) Inventors: Thomas Harmening, Munster (DE); Marcos Schoneborn, Hamburg (DE)

( * ) Notice: Subject to any disclaimer, the term of this patent is extended or adjusted under 35 U.S.C. 154(b) by 582 days.

(21) Appl. No.: 17/620,534

(22) PCT Filed: Jul. 10, 2020

(86) PCT No.: PCT/EP2020/069669
§ 371 (c)(1),
(2) Date: Dec. 17, 2021

(87) PCT Pub. No.: WO2021/005241
PCT Pub. Date: Jan. 14, 2021

(65) Prior Publication Data
US 2022/0356069 A1    Nov. 10, 2022

(30) Foreign Application Priority Data
Jul. 10, 2019   (EP) .................... 19185570

(51) Int. Cl.
C01F 7/166    (2022.01)
C09K 11/77    (2006.01)

(52) U.S. Cl.
CPC .......... *C01F 7/166* (2013.01); *C09K 11/7734* (2013.01); *C01P 2002/52* (2013.01); *C01P 2002/60* (2013.01); *C01P 2002/72* (2013.01); *C01P 2004/03* (2013.01); *C01P 2004/32* (2013.01); *C01P 2004/61* (2013.01); *C01P 2004/62* (2013.01); *C01P 2004/64* (2013.01); *C01P 2006/12* (2013.01); *C01P 2006/14* (2013.01); *C01P 2006/16* (2013.01)

(58) Field of Classification Search
CPC .. C09K 11/7734; C01F 7/166; C01P 2002/52; C01P 2002/60; C01P 2004/32; C01P 2004/61; C01P 2004/62; C01P 2004/64; C01P 2006/14; C01P 2006/16; C01P 2006/12
See application file for complete search history.

(56) References Cited

FOREIGN PATENT DOCUMENTS

| EP | 1090975 | 4/2001 |
|---|---|---|
| EP | 2626401 | 8/2013 |

(Continued)

OTHER PUBLICATIONS

Kutty, et al. "Luminescence of Eu2+ in Strontium aluminates prepared by the hydrothermal method" Materials Research Bulletin, Elsevier, pp. 1355-1362, Nov. 1990.

(Continued)

*Primary Examiner* — C Melissa Koslow
(74) *Attorney, Agent, or Firm* — Werner IP Law, P.C.

(57) ABSTRACT

The invention relates to a strontium aluminate mixed oxide precursor and a method for producing same, as well as to a strontium aluminate mixed oxide and method for producing same. The strontium aluminate mixed oxide precursor can be transformed into a strontium aluminate mixed oxide at relatively low temperature. The strontium aluminate mixed oxide is characterized by substantially spherically-shaped particles with a spongy- or porous bone-like microstructure. A luminescent material including a strontium aluminate mixed oxide is also provided.

17 Claims, 7 Drawing Sheets

(56) References Cited

FOREIGN PATENT DOCUMENTS

EP         3042511       7/2016
WO     2012021259     2/2012

OTHER PUBLICATIONS

Rojas-Hernandez, et al. "Long lasting phosphors; $SrAl_2O_4$: Eu, Dy as the most studied material" Renewable and Sustainable Energy Reviews, vol. 81, pp. 2759-2770, Jun. 2017.

Pan, et al. "Hydrothermally-mediated preparation and photoluminescent properties of $Sr_3Al_2O_6$: $Eu^{3+}$ phosphor", Materials Research Bulletin, vol. 41, issue 2, 2006, pp. 225-231.

STRONTIUM ALUMINATE MIXED OXIDE AND METHOD FOR PRODUCING SAME

FIELD OF THE INVENTION

This invention relates generally to a mixed oxide useful for the production of luminescent materials. More particularly, this invention relates to a strontium aluminate mixed oxide precursor and a method for producing same, to a strontium aluminate mixed oxide and a method for producing same and to a luminescent material comprising a strontium aluminate mixed oxide.

BACKGROUND OF THE INVENTION

Strontium aluminates doped with europium ($Eu^{2+}$) and dysprosium ($Dy^{3+}$) as activators, especially $SrAl_2O_4$:Eu and $SrAl_2O_4$:Dy and their derivatives, are well known for their application as luminescent particles with long afterglow properties. Such particles are used, for example, in cements, on emergency signs, as hands and time interval markers within luminous clocks, on road signs or on or within fabrics.

Typically, these materials are prepared by conventional ceramic methods, such as by solid state reaction of physical mixtures of the corresponding metal oxides and/or carbonates. These methods include intensive thermal treatments at high temperatures of around 1300° C. to 1500° C. Sometimes, the mixed oxide precursor is subjected to ball milling prior to thermal treatment in order to enhance reactivity. This leads to high energy consumption in the production process of such mixed oxides.

EP 0622440 A1 describes a production process for a phosphorescent phosphor which involves milling a physical mixture of $SrCO_3$, $Eu_2O_3$, $Al_2O_3$ and boric acid (as a flux) in a ball mill and subsequently heating for 1 hour at 1300° C. Energy intensive and costly milling steps are necessary in order to obtain the desired particle size distribution for applying and dispersing the material in the desired final application, for example, as a resin or as a coating. The publication Kutty T. R. N. et al' "Luminescence of EU in Strontium Aluminates prepared by hydrothermal methods", 1 Nov. 1990, MATERIALS RESEARCH BULLETIN, ELSEVIER, KIDLINGTON, GB pages 1355 to 1362 ISSN0025-5408 describes the use of an alumina gel and $SrO_2$ to make luminescent materials. In a gel the solid is continuous phase. A gel is no suspension.

Due to the highly sintered nature of strontium aluminate mixed oxides obtained by high temperature treatment (which is an integral part of conventional ceramic methods), the milling step requires high energy input and long duration. This makes the production process for strontium aluminate mixed oxides by conventional ceramic methods inefficient; furthermore, the intensive milling step creates defects in the material that decreases its luminescent properties.

A solution proposed in the art to reduce the formation temperature of strontium aluminate mixed oxides is to apply sol-gel and combustion synthesis techniques. These techniques are typically carried out by mixing a metal nitrate with an organic fuel and heating the mixture to around 500° C. to 700° C. This method produces mixed oxides with lower relative energy input to conventional ceramic methods by making use of the exothermic energy of combustion of the organic fuel. However, extensive exhaust gas after treatment systems are needed for such processes in order to avoid the emission of undesirable gases to the environment. Further, fluffy fine particles are produced that tend to form dust during handling in downstream processes.

Therefore, there is a need for a more energy efficient process to produce strontium aluminate mixed oxides. In other words, there is a need for a process in which strontium aluminate mixed oxides can be produced at relatively low temperature (relative to conventional ceramic methods) and for a process that produces a strontium aluminate mixed oxide with a microstructure that easily breaks up during a milling treatment.

SUMMARY OF THE INVENTION

According to a first aspect of the invention, there is provided a method of preparing a strontium aluminate mixed oxide precursor, the method comprising:
  i) providing an alumina suspension;
  ii) adding a strontium compound to the alumina suspension to form a strontium alumina suspension (Sr—Al suspension);
  iii) where hydrothermally treating
    a) the alumina suspension (without that the Sr—Al suspension obtained there-after is hydrothermally treated) or
    b) the Sr—Al suspension (without that the alumina suspension obtained before is hydrothermally treated) or
    c) both the alumina suspension and the Sr—Al suspension is applied to obtain
    a hydrothermally treated alumina suspension from a),
    a hydrothermally treated Sr—Al suspension, from b) or
    both a hydrothermally treated alumina suspension and a hydrothermally treated Sr—Al suspension from c); and
  iv) drying the hydrothermally treated Sr—Al suspension (obtained via b) or c)) or the Sr—Al suspension (obtained via a))
    to produce the strontium aluminate mixed oxide precursor, This means that the Sr—Al suspension of step iv) comprises the alumina suspension in the form of a hydrothermally treated alumina suspension, whereto a strontium compound was added after the hydrothermal treatment, without that the Sr—Al suspension is additionally hydrothermally treated.

Therefore, according to a first option of the first aspect of the invention, there is provided a method of preparing a strontium aluminate mixed oxide precursor, the method comprising:
  i) providing an alumina suspension;
  ii) hydrothermally treating the alumina suspension to obtain a hydrothermally treated alumina suspension;
  iii) adding a strontium compound to the hydrothermally treated alumina suspension to form a strontium alumina suspension (Sr—Al suspension); and
  iv) drying the Sr—Al suspension to produce the strontium aluminate mixed oxide precursor.

According to a second option of the first aspect of the invention, there is provided a method of preparing a strontium aluminate mixed oxide precursor, the method comprising:
  i) providing an alumina suspension;
  ii) adding a strontium compound to the alumina suspension to form a strontium alumina suspension (Sr—Al suspension);

iii) hydrothermally treating the Sr—Al suspension to obtain a hydrothermally treated Sr—Al suspension; and iv) drying the hydrothermally treated Sr—Al suspension to produce the strontium aluminate mixed oxide precursor.

According to a third option of the first aspect of the invention, there is provided a method of preparing a strontium aluminate mixed oxide precursor, the method comprising:

i) providing an alumina suspension;

ii) hydrothermally treating the alumina suspension to obtain a hydrothermally treated alumina suspension;

iii) adding a strontium compound to the hydrothermally treated alumina suspension to form a strontium alumina suspension (Sr—Al suspension);

iv) hydrothermally treating the Sr—Al suspension to obtain a hydrothermally treated Sr—Al suspension; and v) drying the hydrothermally treated Sr—Al suspension to produce the strontium aluminate mixed oxide precursor.

The second option of the first aspect of the invention is preferred.

The following explanations apply to all aspects of the present invention and not only to the first aspect.

The alumina suspension may be a suspension of an aluminum oxide hydroxide (AlO(OH)), an aluminum hydroxide (Al(OH)$_3$), an aluminum oxide (Al$_2$O$_3$), or any combination thereof. The aluminum oxide hydroxide may be boehmite, diaspore or any combination thereof. The aluminum hydroxide may be gibbsite, bayerite or any combination thereof. The aluminum oxide may be a transition alumina such as γ-(gamma), δ(delta), θ(theta), α(alpha) alumina or any combination thereof.

Preferably, the alumina suspension is an aluminum oxide hydroxide suspension and more preferably, the aluminum oxide hydroxide suspension is a boehmite suspension. The boehmite may have a crystallite size (021) and/or (020) reflex of between 3 nm and 50 nm, preferably of between 4 nm and 45 nm.

The alumina suspension is preferably an aqueous suspension. By aqueous suspension is meant that the alumina is added to at least water.

The alumina suspension may have a solids content in the range of from 1 wt % to 30 wt %, preferably in the range of from 3 wt % to 15 wt %.

The solids in the alumina suspension may have a mean particle size ($d_{50}$) in the range of from 0.01 μm and 100 μm, preferably in the range of from 0.2 μm and 30 μm, measured by laser diffraction methods (as described hereinafter).

The term $d_{50}$ is well known in the art and refers to the particle size diameter at which 50% of the volume of the particles in a sample is smaller than said particle size diameter and 50% of the volume of the particles in a sample are larger than said diameter.

The suspension is preferably an aqueous suspension, more preferably the liquid suspension medium is water.

The strontium compound may be a strontium salt, strontium oxide, strontium hydroxide or any combination thereof. The strontium salt may be strontium acetate, strontium nitrate, strontium carbonate, strontium chloride or mixtures thereof. Preferably, the strontium compound is a mixture of strontium salts. More preferably, the strontium compound may be a mixture of strontium acetate and strontium carbonate.

Hydrothermally treating the alumina suspension, the Sr—Al suspension or both may be carried out by heating the alumina suspension, the Sr—Al suspension or both to a temperature in the range of from 100° C. to 250° C., preferably to a temperature in the range of from 180° C. to 220° C., for a duration in the range of from 0.5 h to 14 h, preferably for a duration in the range of from 1 h to 8 h in the presence of water. The hydrothermal treatment may be carried out at a pH of between 5 and 12, preferably at a pH of between 6 and 11.

Drying the hydrothermally treated Sr—Al suspension or Sr—Al suspension to produce the strontium aluminate mixed oxide precursor may be by means of spray drying.

According to a second aspect of the invention, there is provided a strontium aluminate mixed oxide precursor produced according to the first aspect of the invention (including the first, second and third option of the first aspect) the strontium aluminate mixed oxide precursor characterized in that calcination is performed at a temperature in the range of from 900° C. to 1100° C. for a duration in the range of from 0.5 h to 5 h, preferably for a duration of 3 h.

According to a third aspect of the invention, there is provided a method of preparing a strontium aluminate mixed oxide, the method comprising:

i) providing an alumina suspension;

ii) adding a strontium compound to the alumina suspension to form a strontium alumina suspension (Sr—Al suspension);

iii) hydrothermally treating i) the alumina suspension, ii) the Sr—Al suspension, or iii) both the alumina suspension and the Sr—Al suspension to obtain a hydrothermally treated alumina suspension, a hydrothermally treated Sr—Al suspension, or both a hydrothermally treated alumina suspension and a hydrothermally treated Sr—Al suspension;

iv) drying the hydrothermally treated Sr—Al suspension or the strontium alumina suspension to produce a strontium aluminate mixed oxide precursor; and v) calcining the strontium aluminate mixed oxide precursor to produce the strontium aluminate mixed oxide.

The third aspect of the invention is the same as described for the first aspect of the invention above but with the calcination step v) additionally applied so that a strontium aluminate mixed oxide is obtained.

Therefore, according to a first option of the third aspect of the invention, there is provided a method of preparing a strontium aluminate mixed oxide, the method comprising:

i) providing an alumina suspension;

ii) hydrothermally treating the alumina suspension to obtain a hydrothermally treated alumina suspension;

iii) adding a strontium compound to the hydrothermally treated alumina suspension to form a strontium alumina suspension (Sr—Al suspension);

iv) drying the Sr—Al suspension to produce the strontium aluminate mixed oxide precursor; and v) calcining the strontium aluminate mixed oxide precursor to produce the strontium aluminate mixed oxide.

According to a second option of the third aspect of the invention, there is provided a method of preparing a strontium aluminate mixed oxide, the method comprising:

i) providing an alumina suspension;

ii) adding a strontium compound to the alumina suspension to form a strontium alumina suspension (Sr—Al suspension);

iii) hydrothermally treating the Sr—Al suspension to obtain a hydrothermally treated Sr—Al suspension;

iv) drying the hydrothermally treated Sr—Al suspension to produce the strontium aluminate mixed oxide precursor; and v) calcining the strontium aluminate mixed oxide precursor to produce the strontium aluminate mixed oxide.

According to a third option of the third aspect of the invention, there is provided a method of preparing a strontium aluminate mixed oxide precursor, the method comprising:

i) providing an alumina suspension;

ii) hydrothermally treating the alumina suspension to obtain a hydrothermally treated alumina suspension;

iii) adding a strontium compound to the hydrothermally treated alumina suspension to form a strontium alumina suspension (Sr—Al suspension);

iv) hydrothermally treating the Sr—Al suspension to obtain a hydrothermally treated Sr—Al suspension;

v) drying the hydrothermally treated Sr—Al suspension to produce the strontium aluminate mixed oxide precursor; and vi) calcining the strontium aluminate mixed oxide precursor to produce the strontium aluminate mixed oxide.

The first option of the third aspect of the invention is preferred.

The alumina suspension may be a suspension of an aluminum oxide hydroxide (AlO(OH)), an aluminum hydroxide ($Al(OH)_3$), an aluminum oxide ($Al_2O_3$), or any combination thereof. The aluminum oxide hydroxide may be boehmite, diaspore, or any combination thereof. The aluminum hydroxide ($Al(OH)_3$) may be gibbsite, bayerite, or any combination thereof. The aluminum oxide may be a transition alumina such as γ-, ó-, θ-, α-alumina, or any combination thereof.

Preferably, the alumina suspension is an aluminum oxide hydroxide suspension and more preferably, the aluminum oxide hydroxide suspension is a boehmite suspension. The boehmite may have a crystallite size (021 reflex) of between 3 nm and 50 nm, preferably of between 3 nm and 45 nm.

The alumina suspension is preferably an aqueous suspension. By aqueous suspension is meant that the alumina is added to at least water or vice versa.

The alumina suspension may have a solids content in the range of from 1 wt % to 30 wt %, preferably in the range of from 3 wt % to 15 wt %.

The solids in the alumina suspension may have a mean particle size ($d_{50}$) in the range of from 0.01 μm and 100 μm, preferably in the range of from 0.2 μm and 30 μm, measured by laser diffraction methods (as described hereinafter). $d_{50}$ is defined above.

The strontium compound may be a strontium salt, strontium oxide, strontium hydroxide or any combination thereof. The strontium salt may be strontium acetate, strontium nitrate, strontium carbonate, strontium chloride or mixtures thereof. Preferably, the strontium compound is a mixture of strontium salts. More preferably, the strontium compound may be a mixture of strontium acetate and strontium carbonate.

Hydrothermally treating the alumina suspension, the Sr—Al suspension or both may be carried out by heating the alumina suspension, the Sr—Al suspension, or both (in two treatment steps) to a temperature in the range of from 100° C. to 250° C., preferably to a temperature in the range of from 180° C. to 220° C., for a duration in the range of from 0.5 h to 14 h, preferably for a duration in the range of from 1 h to 8 h. The hydrothermal treatment may be carried out at a pH of between 5 and 12, preferably at a pH of between 6 and 11.

Drying the Sr—Al suspension or Sr—Al suspension to produce the strontium aluminate mixed oxide precursor may be by means of spray drying.

Calcining the strontium aluminate mixed oxide precursor to produce the strontium aluminate mixed oxide may be carried out at a temperature in the range of from 900° C. to 1100° C., for a duration in the range of from 0.5 h to 5 h. Preferably, calcining the strontium aluminate mixed oxide precursor to produce the strontium aluminate mixed oxide is carried out at a temperature in the range of from 900° C. to 1100° C., for a duration of 3 h.

Calcining the strontium aluminate mixed oxide precursor may be carried out using any calcination method known in the art, for example a rotary kiln calciner or a muffle furnace. These methods are known to a person skilled in the art of the invention.

According to a fourth aspect of the invention, there is provided a strontium aluminate mixed oxide produced according to the third aspect of the invention, characterized in that the strontium aluminate mixed oxide has particles with a spongy- or porous bone-like microstructure.

In this specification, the term "spongy- or porous bone-like microstructure" is intended to mean a particle structure which is characterized by being built up from a non-porous primary framework of particles that are interconnected by thin, fragile sinter necks to a preferably spherically-shaped three-dimensional secondary structure, with a pronounced macro pore structure, the pore size of which that can be measured by Hg intrusion methods. Such a structure is further observable by scanning electron microscopy (SEM).

The strontium aluminate mixed oxide may be $SrAl_2O_4$, $SrAl_4O_7$, $Sr_3Al_2O_6$, $SrAl_{12}O_{19}$, $Sr_4Al_{14}O_{25}$ or mixtures thereof. Preferably, the strontium aluminate mixed oxide is $SrAl_2O_4$.

The strontium aluminate mixed oxide may have a pore volume in the range of from 0.7 to 1.5 ml/g for pore radii in the range of from 300 Å to 5000 Å, measured by Hg intrusion.

The strontium aluminate mixed oxide may have a pore volume of less than 0.05 ml/g for pore radii in the range of from 15 Å to 500 Å, measured by Hg intrusion.

The strontium aluminate mixed oxide may have a particle size in the range of from 1 to 150 μm, preferably in the range of between 5 and 150 μm, measured by laser diffraction.

The strontium aluminate mixed oxide may have substantially spherically-shaped particles. By substantially is meant that at least 60% of the strontium aluminate mixed oxide particles will have a spherical shape. Independently thereof the volume based sphericity of the spherically-shaped particles is preferably between 0.90 and 1.00.

The BET surface area of the strontium aluminate mixed oxide may be less than 20 $m^2$/g.

According to a fifth aspect of the invention, there is provided a strontium aluminate mixed oxide, characterized in that the strontium aluminate mixed oxide has particles with a spongy- or porous bone-like microstructure.

The term "spongy- or porous bone-like microstructure" has the meaning as herein-before defined.

The strontium aluminate mixed oxide may be $SrAl_2O_4$, $SrAl_4O_7$, $Sr_3Al_2O_6$, $SrAl_{12}O_{19}$, $Sr_4Al_{14}O_{25}$ or mixtures thereof. Preferably, the strontium aluminate mixed oxide is $SrAl_2O_4$.

The strontium aluminate mixed oxide may have a pore volume in the range of from 0.7 to 1.5 ml/g for pore radii in the range of from 300 Å to 5000 Å, measured by Hg intrusion.

The strontium aluminate mixed oxide may have a pore volume of less 0.05 ml/g for pore radii in the range of from 15 Å to 500 Å, measured by Hg intrusion.

The strontium aluminate mixed oxide may have a particle size in the range of from 1 to 150 µm, preferably in the range of between 5 and 150 µm, measured by laser diffraction methods (as described hereinafter).

The strontium aluminate mixed oxide may have substantially spherically-shaped particles. By substantially is meant that at least 60% of the strontium aluminate mixed oxide particles will have a spherical shape. Independently thereof the volume based sphericity of the particles is preferably between 0.90 and 1.00.

The BET surface area of the strontium aluminate mixed oxide may be less than 20 $m^2/g$.

According to a sixth aspect of the invention, there is provided a strontium aluminate mixed oxide, characterized in that the strontium aluminate mixed oxide has particles with a spongy- or porous bone-like microstructure and at least one, preferably more than one and most preferably all of the following properties:
- a pore volume of less than 0.05 ml/g for pore radii in the range of from 15 Å to 500 Å, measured by Hg intrusion;
- a pore volume in the range of from 0.7 to 1.5 ml/g for pore radii in the range of from 300 Å to 5000 Å, measured by Hg intrusion;
- a particle size in the range of from 1 to 150 µm, preferably in the range of between 5 and 150 µm, measured by laser diffraction (as described hereinafter);
- substantially spherically-shaped particles, preferably with a volume based sphericity of the particles between 0.90 and 1.00; and
- a BET surface area of less than 20 $m^2/g$.

The strontium aluminate mixed oxide may be $SrAl_2O_4$, $SrAl_4O_7$, $Sr_3Al_2O_6$, $SrAl_{12}O_{19}$, $Sr_4Al_{14}O_{25}$ or mixtures thereof. Preferably, the strontium aluminate mixed oxide is $SrAl_2O_4$.

The strontium aluminate mixed oxide of any of the different aspects of the invention may be doped with an activator to form a doped strontium aluminate mixed oxide. The activator may be a rare earth oxide. The rare earth oxide may be europium (Eu), dysprosium (Dy), or both Eu and Dy. Preferably, the strontium aluminate mixed oxide is doped with both Eu and Dy. The doped strontium aluminate mixed oxide is preferably doped with less than 5 wt. % of the total rare earth oxide mass, preferably between 0.5 and less than 5 wt. %.

According to a seventh aspect of the invention, there is provided a luminescent material which includes a strontium aluminate mixed oxide as hereinbefore described, or a strontium aluminate mixed oxide produced according the method of the invention.

The strontium aluminate mixed oxide produced according to the method of the invention, or the strontium aluminate mixed oxide as hereinbefore described may be used in luminescent materials.

As stated herein before, the strontium aluminate mixed oxide of any of the different aspects 2 to 7 of the invention is preferably characterized by a pore volume below 0.05 ml/g for pore radii in the range of from 15 Å and 500 Å (the mesopore region) and a pore volume in the range of from 0.7 to 1.5 ml/g for pore radii in the range of from 300 Å to 5000 Å, measured by Hg intrusion. This pronounced macro pore structure is indicative of the spongy-like or porous bone-like microstructure of the particles of the strontium aluminate mixed oxide. This is further observable by scanning electron microscopy (SEM).

DETAILED DESCRIPTION OF THE INVENTION

As shown in FIG. 1, the spongy- or porous bone-like microstructure of the strontium aluminate mixed oxide of the present invention is easily observable by scanning electron microscopy (SEM).

In contrast, the SEM image of a strontium aluminate mixed oxide that has been prepared according to a conventional ceramic method (e.g. as shown in FIG. 2) reveals a dense structure of strongly agglomerated large particles.

Without being bound by theory, the inventors believe that the spongy- or porous bone-like microstructure of the strontium aluminate mixed oxide of the present invention is at least in partly responsible for the benefits realized in respect of the more efficient milling behavior of the mixed oxide, for example in phosphorescent agents.

The inventors have found that the strontium aluminate mixed oxide precursor of the present invention can be transformed into the strontium aluminate mixed oxide at temperatures as low as 900° C. This is advantageous as the transformation occurs at temperatures below conventionally known techniques.

Furthermore, the inventors have found that the strontium aluminate mixed oxide of the present invention has spherically-shaped particles and a spongy- or porous bone-like microstructure, which easily breaks up in a milling treatment. Thus, by using the strontium aluminate mixed oxide precursor of the present invention and the strontium aluminate mixed oxide of the invention, e.g. for phosphorescent agents, process efficiency can be improved since overall energy demand and milling throughput time are reduced, while at the same time the deterioration of luminescent properties caused by intensive milling are reduced.

Analytical Methods and Parameter Definition as Applied

Particle Size and Particle Size Distribution:

The $d_{50}$ value of the inorganic particles in the dispersion medium is measured by laser scattering with a Malvern Mastersizer 2000 in an aqueous dispersion applying Fraunhofer theory. d stands for diameter. The particles measured comprise substantially no agglomerated particles.

Crystallite Size:

The crystallite size of the boehmite is determined by the Scherrer method, using the (021) reflection in the X-ray powder diffraction pattern.

Surface Area:

The BET surface area and pore volume are measured with $N_2$ physisorption using typical volumetric devices like the Quadrasorb from Quantachrome at temperature of liquid nitrogen. The surface area is determined using Brunauer-Emmett-Teller (BET) method (DIN ISO 9277:2003-05).

Pore Volume and Pore Radii:

The pore volume and the pore radii as provided herein are measured by Hg intrusion using the method proposed by Barrett, Joyner and Halenda (BJH) at 77 K.

The pore size distribution is determined with mercury intrusion using a Porosimeter Autopore IV 9500 from Micromeritics according to DIN 66133. The pore size is provided as a radius.

SEM pictures were taken by a FEI Phenom instrument in back scattered electron mode. Samples were sputtered with Gold prior the measurement.

As described in ISO 13322-2 (2006) the volume based sphericity (also in short sphericity) is determined by dynamic image analysis with a Camsizer P4 from Retsch. The sphericity (SPHT3) is calculated from the measured perimeter P and area A of the particle projection using following equation $$SPHT3 = \frac{4\pi A}{P^2}$$

The determined value is dimensionless and would be 1 for an ideal sphere (also called "spherically-shaped") and is typically below 1 for spherically-shaped particles which are non-ideal spheres. In the present case the sphericity is above 0.9.

Sphericity and Spongy- or Porous Bone-Like Structureis visualised by SEM.

EXAMPLES

The invention will now be described with reference to the following non-limiting examples and Figures in which.

EXAMPLE 1

Strontium aluminate mixed oxide was produced according to the method of the invention. 208.8 g of a boehmite-containing suspension with 7.1% solid content was mixed with a solution comprising 16.3 g strontium acetate and 17.2 g $SrCO_3$ in 200 g distilled water. After hydrothermal treatment at 210° C. for 5 h, at a pH of 8.5 the suspension was spray dried to obtain a strontium aluminate mixed oxide precursor. The strontium aluminate mixed oxide precursor was calcined at 1000° C. for 3 h to form a strontium aluminate mixed oxide. The strontium aluminate mixed oxide was analyzed by SEM and X-ray diffraction (XRD).

Figure 1:
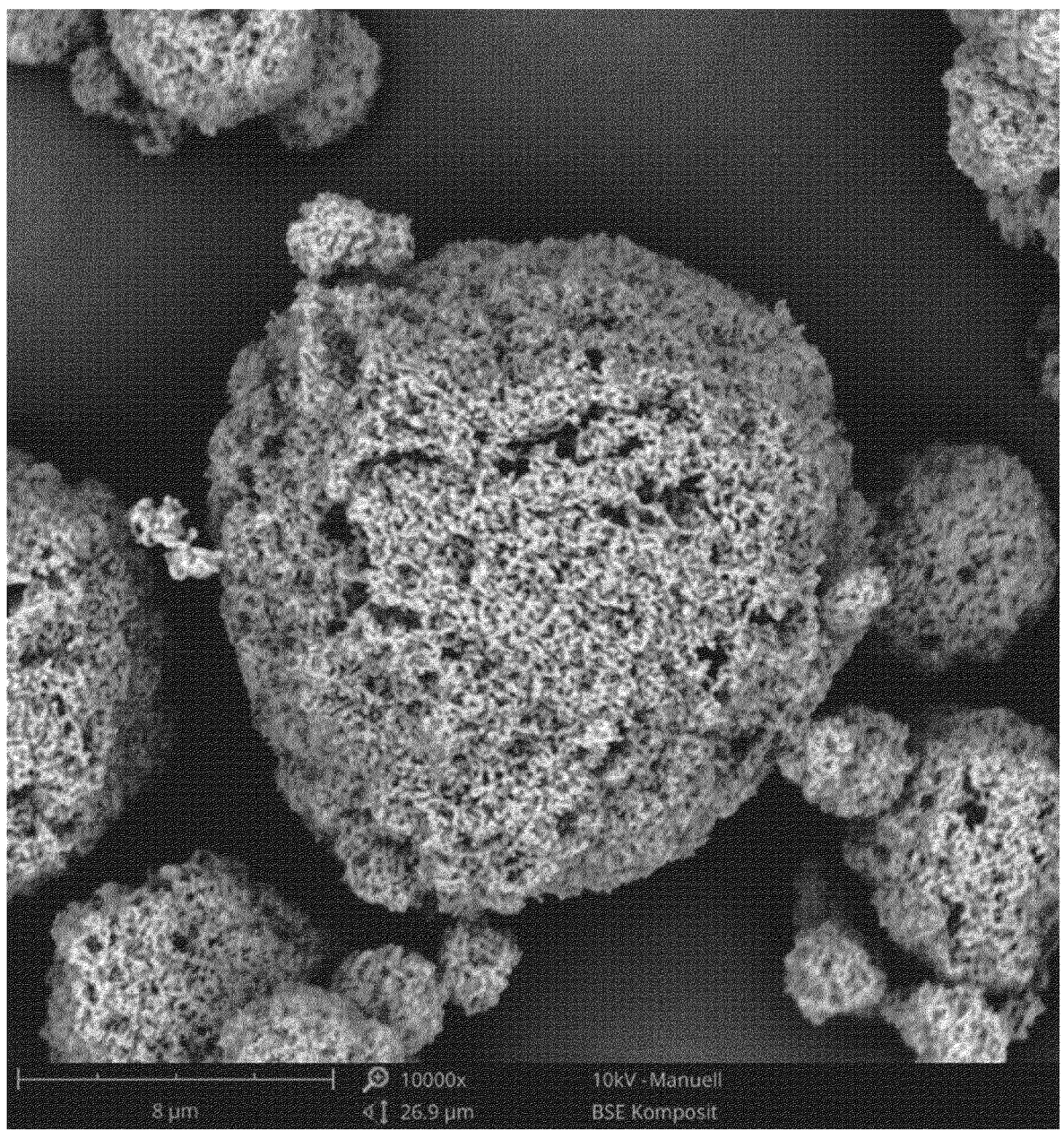
FIG. 1 is an SEM image of the strontium aluminate mixed oxide produced according to Example 1.

FIG. 1 clearly shows the spongy-like or porous bone-like microstructure of the strontium aluminate mixed oxide.

Figure 4:
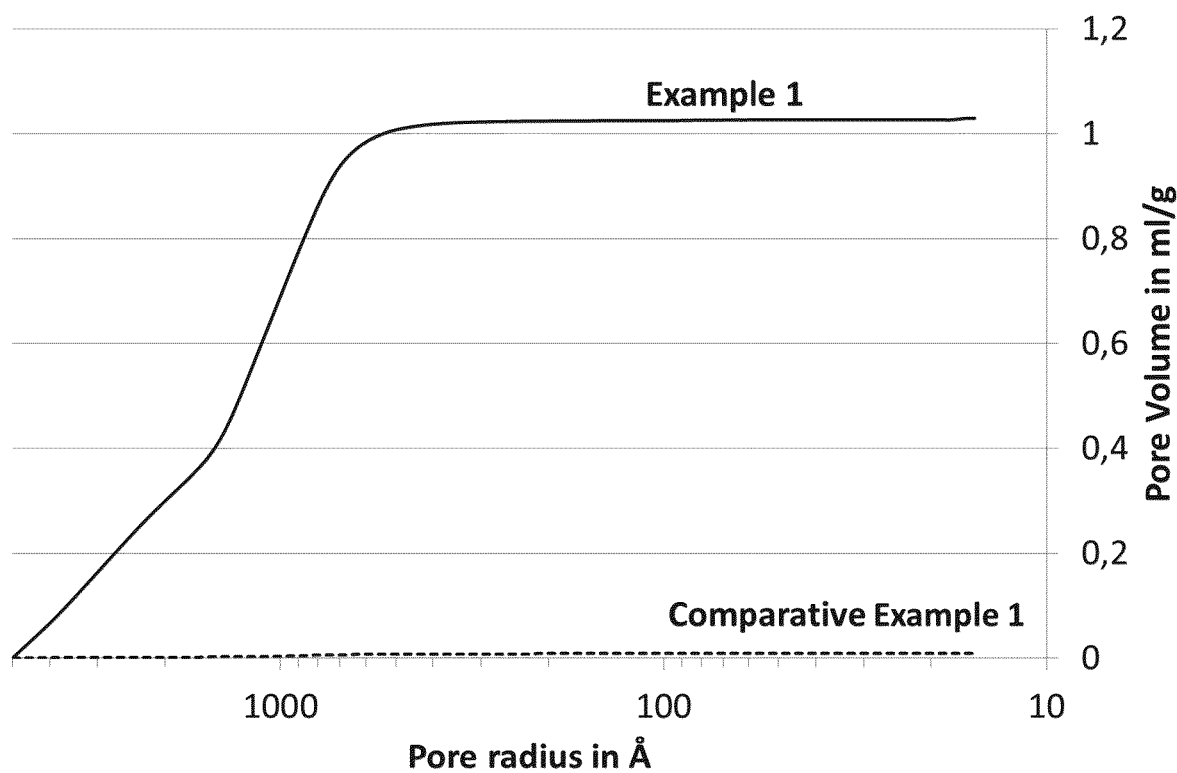
FIG. 4 is graph comparing the pore volume and pore sizes of Example 1 and Comparative Example 1.

As shown in FIG. 4, the pore volume of the strontium aluminate mixed oxide for pore sizes between 300 Å and 5000 Å, determined by Hg intrusion, is 1.02 ml/g. The pore volume of the strontium aluminate mixed oxide for pore sizes between 15 Å and 500 Å, determined by Hg intrusion, is 0.02 ml/g.

Figure 5:
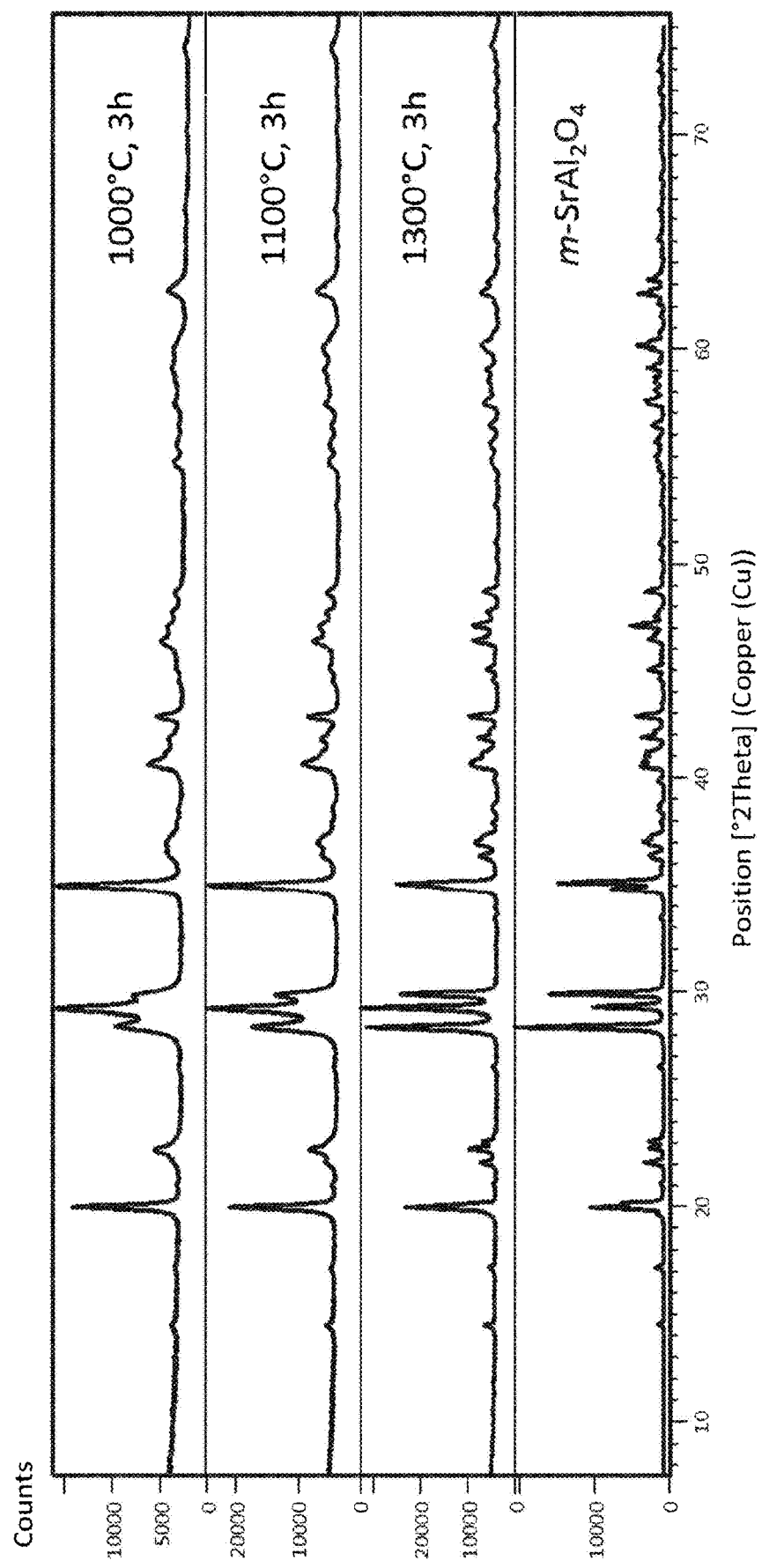
FIG. 5 is an XRD of the phase composition of the strontium aluminate mixed oxide produced according to Example 1.

FIG. 5 shows the presence of $SrAl_2O_4$ in the phase composition of the strontium aluminate mixed oxide produced according the method of the invention.

COMPARATIVE EXAMPLE 1

A stoichiometric mixture of $SrCO_3$ and $\gamma$-$Al_2O_3$ (commercially available under the trade name PURALOX SBa-150 with a mean particle size (d50) of 30 µm) was mixed in a mortar and calcined for 3 h at 1500° C., according to a conventional ceramic method.

Figure 2:
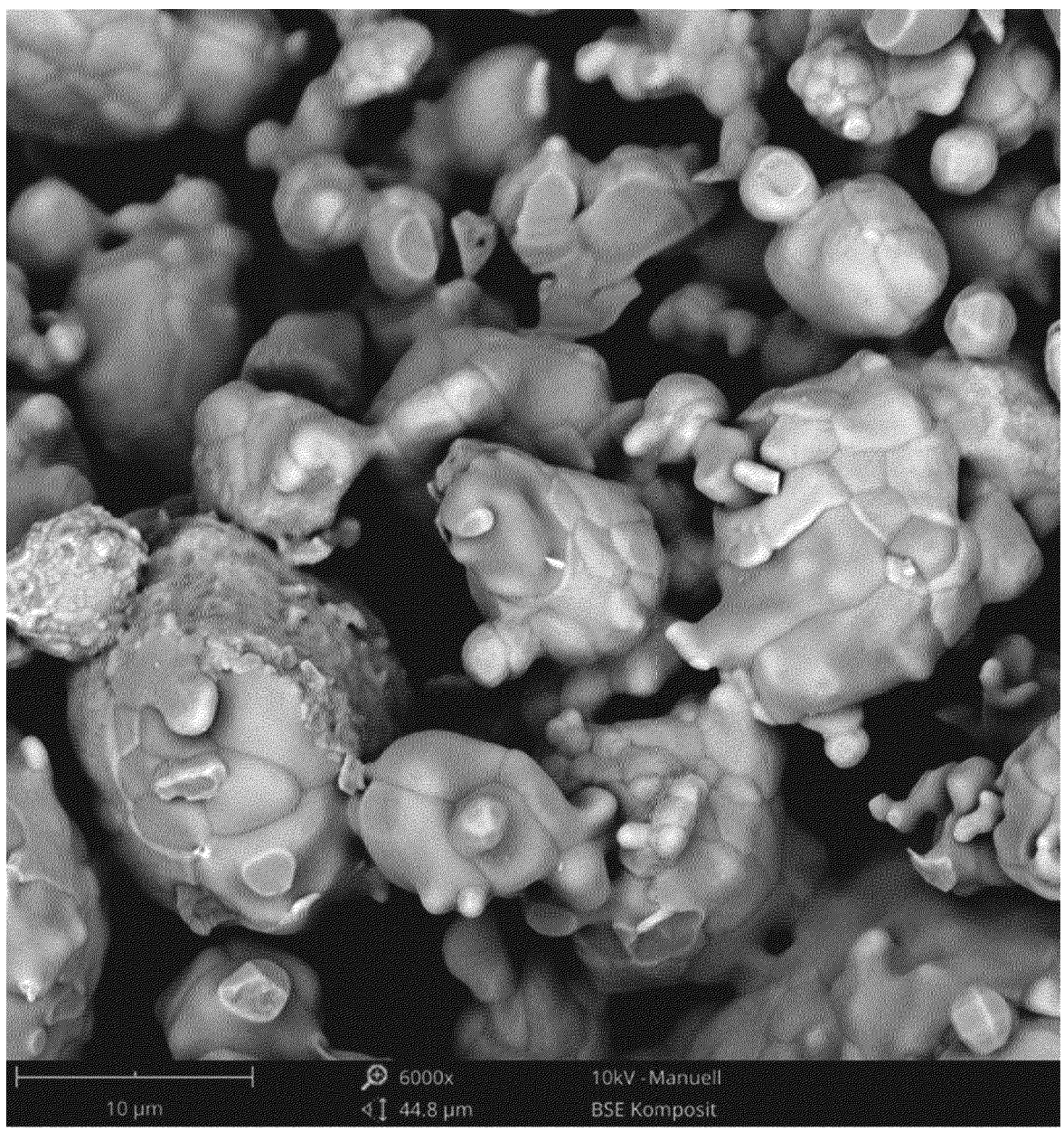
FIG. 2 is an SEM image of the strontium aluminate mixed oxide produced according to Comparative Example 1.

FIG. 2 shows the dense, highly sintered nature of the product prepared by the conventional ceramic method. The highly sintered nature of the material is confirmed by the measured pore volumes. As shown in FIG. 4, the pore volume for pore sizes provided as pore radius between 300 Å and 5000 Å determined by Hg intrusion is smaller than 0.01 ml/g and the pore volume for pore sizes between 15 Å and 500 Å determined by Hg intrusion, is also smaller than 0.01 ml/g.

Figure 6:
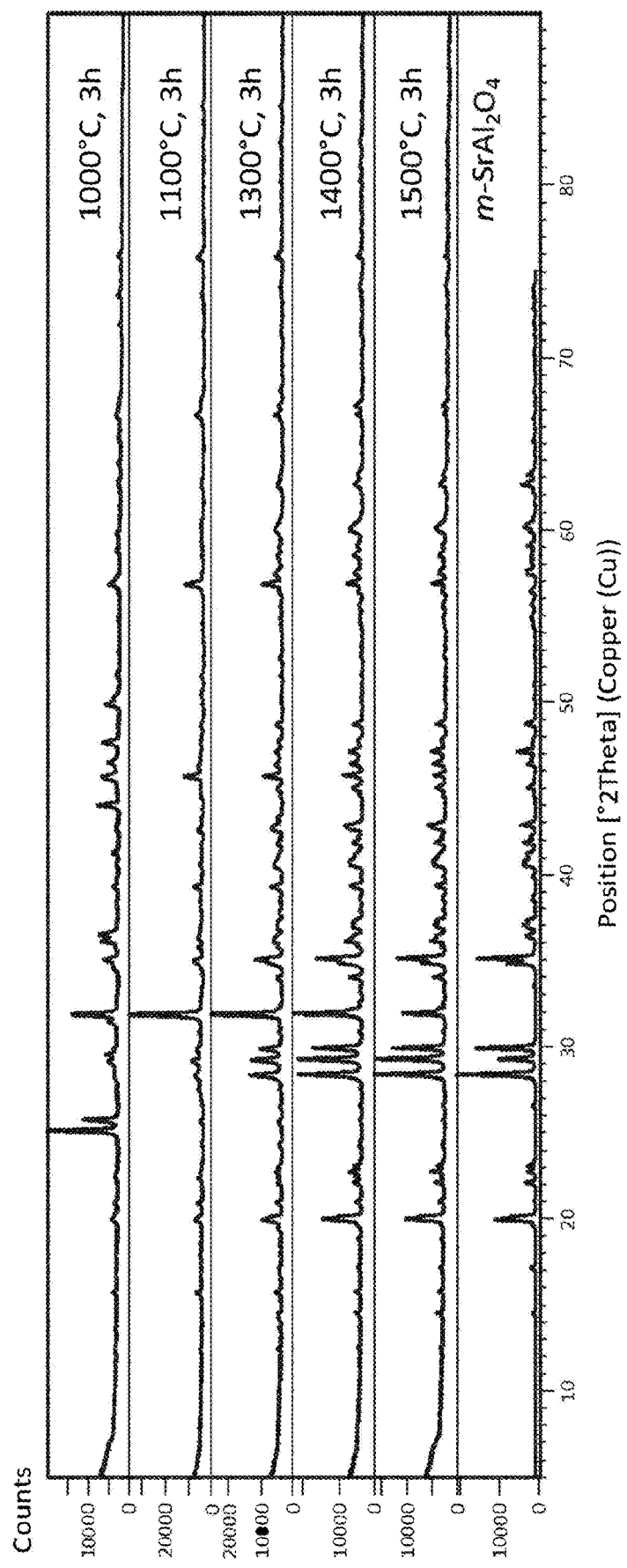
FIG. 6 is an XRD showing a mixture of monoclinic $SrAl_2O_4$ together with $SrAl_{12}O_{19}$ and $Sr_3Al_2O_6$ as side products of the product according to comparative Example 1.

FIG. 6 shows a mixture of monoclinic $SrAl_2O_4$ together with $SrAl_{12}O_{19}$ and $Sr_3A_2O_6$ as side products, indicating that the solid state reaction is still not fully completed at 1500° C.

Milling Tests

Material from Example 1 and Comparative Example 1 were each suspended in water up to a 5 wt % solids content. Each suspension was treated in an ULTRA-TUR-RAX high shear mixer, operated at 600 rpm.

The particle size ($d_{50}$) of the solids in each suspension was measured by laser diffraction after 5, 10 and 15 minutes. For comparative purposes, the measured $d_{50}$ value after 10 minutes and 15 minutes is referenced to the $d_{50}$ value as determined after 5 minutes.

Figure 7:
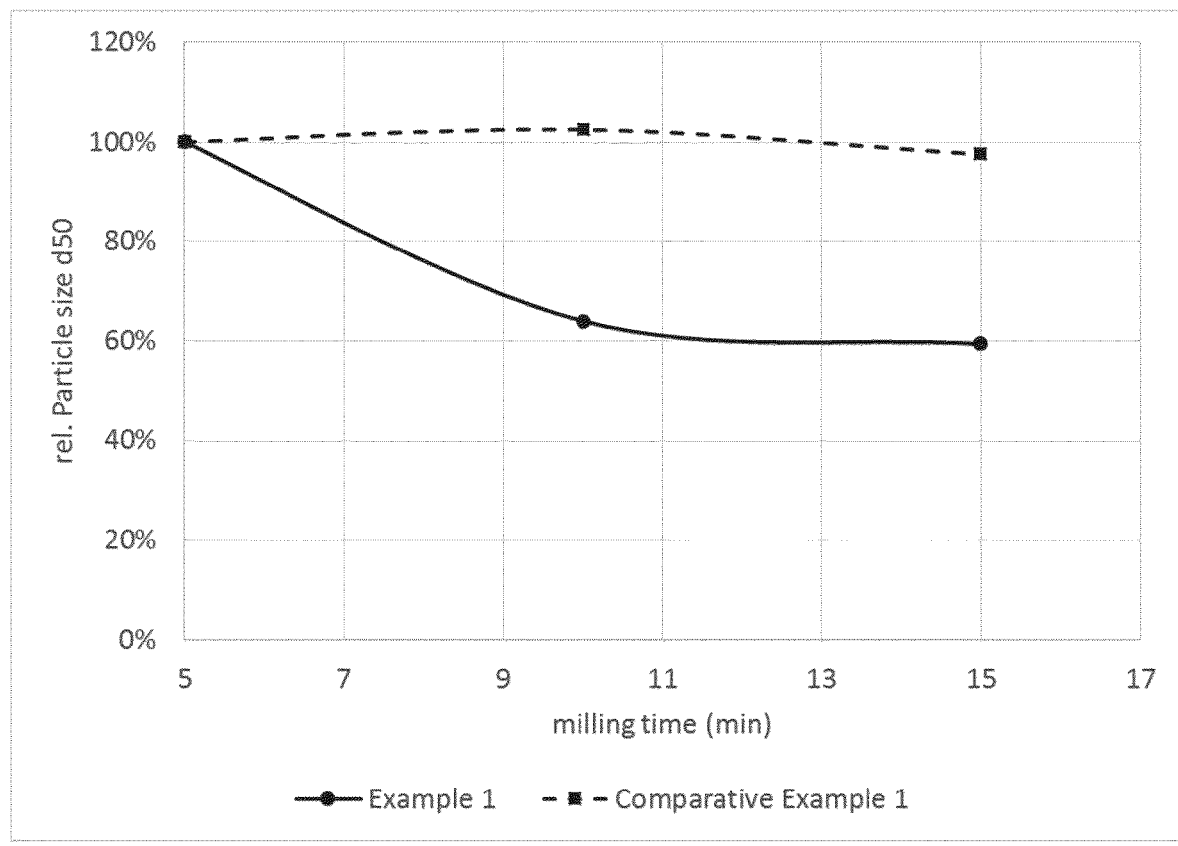
FIG. 7 is a graph comparing particle size (measured by Malvern Mastersizer) and milling times of Example 1 and Comparative Example 1.

As shown in Table 1 and FIG. 7, it is clear that the inventive material of Example 1 easily breaks up during milling, whereas no particle reduction is observed with the materials obtained from Comparative Example 1 under these milling conditions.

TABLE 1

|  |  | 5 min | 10 min | 15 min |
|---|---|---|---|---|
| Example 1 | relative $d_{50}$ | 100% | 64% | 59% |
| Comparative Example 1 | relative $d_{50}$ | 100% | 102% | 98% |

COMPARATIVE EXAMPLE 2

The Sr-aluminate was prepared according to Kutty et. al (Mat. Res. Bull. 25, (1990), 1355.

A solution of 25 wt. % $NH_3$ in water was added to an aqueous solution of Al-sulfate at 60° C. to precipitate an $Al_2O_3$*$xH_2O$ gel. The gel was washed free of sulfate with water. The X-ray powder diffraction analysis of this gel revealed a pronounced pseudoboehmite character with crystallite size measured at the of 1.5 nm.

The gel was mixed with SrO that was freshly prepared from calcination of $SrCO_3$ in a molar ratio of Al:Sr of 2:1. The mixture was hydrothermally aged at 240° C. for 6 h. The solid was separated by filtration, washed with water, acetone-dried and calcined at 1000° C. for 3 h.

The obtained pore volume is included in Table 2

TABLE 2

|  | Comparative Example 1 | Comparative Example 2 | Example 1 |
|---|---|---|---|
| Pore volume (Hg) 15-500 Å | <0.01 | 0.026 | 0.02 |
| Pore volume (Hg) 300-5000 Å | <0.01 | 0.65 | 1.02 |

Figure 3:
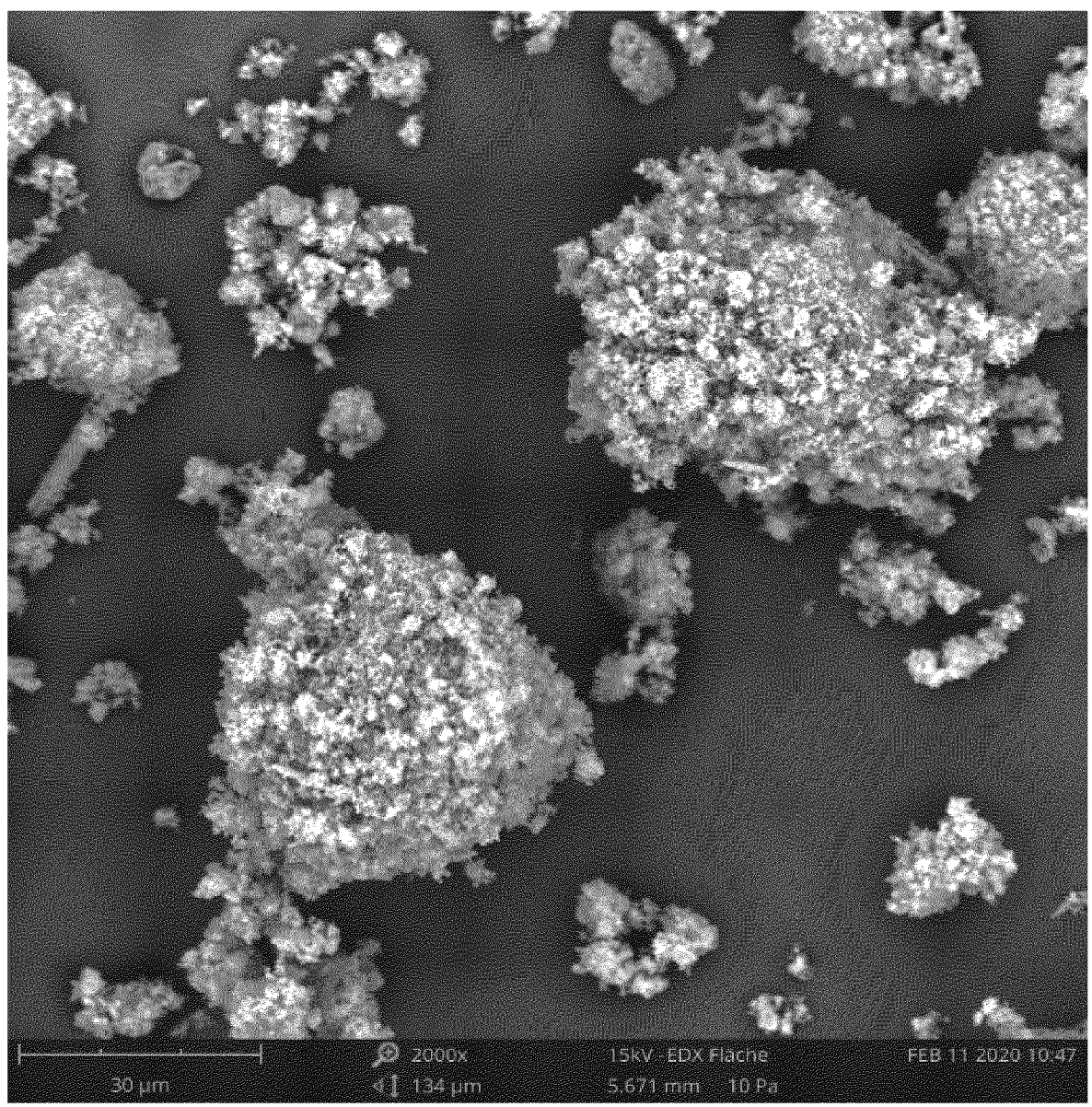
FIG. 3 is an SEM image of the strontium aluminate mixed oxide produced according to Comparative Example 2.

As can be seen in FIG. 3 the shape of the particles is not spherical and the microstructure deviates from the spongy-bone character.

Therefore, it is shown that the material properties as described in the present invention cannot be obtained by the process described by Kutty et al.

The invention claimed is:

1. A method of preparing a strontium aluminate mixed oxide precursor, the method comprising:
a) according to a first method:
i) providing a boehmite suspension, wherein the boehmite in the boehmite suspension has a crystallite size (021 and/or 020 reflex) of between 3 nm and 50 nm;
ii) hydrothermally treating the suspension to obtain a hydrothermally treated boehmite suspension;
iii) adding a strontium compound to the hydrothermally treated boehmite suspension to form a strontium alumina suspension (Sr—Al suspension); and
iv) drying the Sr—Al suspension to produce the strontium aluminate mixed oxide precursor; or
b) according to a second method:
i) providing a boehmite suspension, wherein the boehmite in the boehmite suspension has a crystallite size (021 and/or 020 reflex) of between 3 nm and 50 nm;
ii) adding a strontium compound to the boehmite suspension to form a strontium alumina suspension (Sr—Al suspension);
iii) hydrothermally treating the Sr—Al suspension to obtain a hydrothermally treated Sr—Al suspension; and
iv) drying the hydrothermally treated Sr—Al suspension to produce the strontium aluminate mixed oxide precursor; or
c) according to a third method:
i) providing a boehmite suspension, wherein the boehmite in the boehmite suspension has a crystallite size (021 and/or 020 reflex) of between 3 nm and 50 nm;
ii) hydrothermally treating the suspension to obtain a hydrothermally treated boehmite suspension;
iii) adding a strontium compound to the hydrothermally treated boehmite suspension to form a strontium alumina suspension (Sr—Al suspension);
iv) hydrothermally treating the Sr—Al suspension to obtain a hydrothermally treated Sr—Al suspension; and
v) drying the hydrothermally treated Sr—Al suspension to produce the strontium aluminate mixed oxide precursor.

2. The method according to claim 1 in which the hydrothermal treatment is carried out by heating the boehmite suspension, the Sr—Al suspension or both to a temperature in the range of from 100° C. to 250° C. for a duration in the range of from 0.5 h to 14 h in the presence of water.

3. The method according to claim 1, wherein the boehmite in the boehmite suspension has a crystallite size (021 and/or 020 reflex) of between 3 nm and 45 nm.

4. The method according to claim 1, wherein the strontium compound is a strontium salt or a mixture of strontium salts.

5. The method according to claim 1, wherein calcining the strontium aluminate mixed oxide precursor to produce the strontium aluminate mixed oxide is carried out at a temperature in the range of from 900° C. to 1100° C., for a duration in the range of from 0.5 h to 5 h.

6. The method according to claim 1, wherein the boehmite suspension is further characterized by one or more of:
a) the boehmite suspension is an aqueous suspension;
b) the boehmite suspension has a solids content in the range of from 1 wt % to 30 wt %; and/or
c) the boehmite in the boehmite suspension has a mean particle size ($d_{50}$) in the range of from 0.01 μm and 100 μm.

7. A strontium aluminate mixed oxide, wherein the strontium aluminate mixed oxide has particles with a spongy- or porous bone-like microstructure, which is characterized by being built up from a non-porous primary framework of particles that are interconnected by thin, fragile sinter necks to a three-dimensional secondary structure, with a pronounced macro pore structure, and at least the following properties:
i) a pore volume of less than 0.05 ml/g for pore radii in the range of from 15 Å to 500 Å, measured by Hg intrusion; and
ii) a pore volume in the range of from 0.7 to 1.5 ml/g for pore radii in the range of from 300 Å to 5000 Å, measured by Hg intrusion.

8. The strontium aluminate mixed oxide according to claim 7 having a particle size in the range of from 1 to 150 μm measured by laser diffraction methods.

9. The strontium aluminate mixed oxide according to claim 7 having a substantially spherically-shaped particles with a volume based sphericity of the particles between 0.90 and 1.00 determined by dynamic image analysis according to ISO 13322-2 (2006).

10. The strontium aluminate mixed oxide according to claim 7 having a BET surface area of less than 20 m$^2$/g.

11. The strontium aluminate mixed oxide according to claim 7, wherein the strontium aluminate mixed oxide is $SrAl_2O_4$, $SrAl_4O_7$, $Sr_3Al_2O_6$, $SrAl_{12}O_{19}$, $Sr_4Al_{14}O_{25}$ or mixtures thereof.

12. The strontium aluminate mixed oxide according to claim 7, wherein the strontium aluminate mixed oxide is doped with an activator.

13. A method of preparing a strontium aluminate mixed oxide, the method comprising:
a) according to a first method:
i) providing a boehmite suspension, wherein the boehmite in the boehmite suspension has a crystallite size (021 and/or 020 reflex) of between 3 nm and 50 nm;
ii hydrothermally treating the suspension to obtain a hydrothermally treated boehmite suspension;
adding a strontium compound to the hydrothermally treated boehmite suspension to form a strontium alumina suspension (Sr—Al suspension);
iv) drying the Sr—Al suspension to produce the strontium aluminate mixed oxide precursor; and
v) calcining the strontium aluminate mixed oxide precursor to produce the strontium aluminate mixed oxide; or
b) according to a second method:
i) providing a boehmite suspension, wherein the boehmite in the boehmite suspension has a crystallite size (021 and/or 020 reflex) of between 3 nm and 50 nm;

ii) adding a strontium compound to the boehmite suspension to form a strontium alumina suspension (Sr—Al suspension);

iii) hydrothermally treating the Sr—Al suspension to obtain a hydrothermally treated Sr—Al suspension; and iv) drying the hydrothermally treated Sr—Al suspension to produce the strontium aluminate mixed oxide precursor; and v) calcining the strontium aluminate mixed oxide precursor to produce the strontium aluminate mixed oxide; or c) according to a third method:

i) providing a boehmite suspension, wherein the boehmite in the boehmite suspension has a crystallite size (021 and/or 020 reflex) of between 3 nm and 50 nm;

ii) hydrothermally treating the suspension to obtain a hydrothermally treated boehmite suspension;

iii) adding a strontium compound to the hydrothermally treated boehmite suspension to form a strontium alumina suspension (Sr—Al suspension);

iv) hydrothermally treating the Sr—Al suspension to obtain a hydrothermally treated Sr—Al suspension;

v) drying the hydrothermally treated Sr—Al suspension to produce the strontium aluminate mixed oxide precursor; and vi) calcining the strontium aluminate mixed oxide precursor to produce the strontium aluminate mixed oxide.

14. The method according to claim 13 in which the hydrothermal treatment is carried out by heating the boehmite suspension, the Sr—Al suspension or both to a temperature in the range of from 100° C. to 250° C. for a duration in the range of from 0.5 h to 14 h in the presence of water.

15. The method according to claim 13, wherein the boehmite in the boehmite suspension has a crystallite size (021 and/or 020 reflex) of between 3 nm and 45 nm.

16. The method according to claim 13, wherein the strontium compound is a strontium salt or a mixture of strontium salts.

17. The method according to claim 13, wherein the boehmite suspension is further characterized by one or more of:

a) the boehmite suspension is an aqueous suspension;

b) the boehmite suspension has a solids content in the range of from 1 wt % to 30 wt %; and/or c) the boehmite in the boehmite suspension has a mean particle size ($d_{50}$) in the range of from 0.01 μm and 100 μm.

* * * * *